Nov. 27, 1956  G. J. SHOMPHE  2,772,046
ELECTRIC-BLOWER
Filed Nov. 23, 1953 2 Sheets-Sheet 1

INVENTOR
George J. Shomphe
BY
ATTORNEY

Nov. 27, 1956  G. J. SHOMPHE  2,772,046
ELECTRIC-BLOWER
Filed Nov. 23, 1953  2 Sheets-Sheet 2
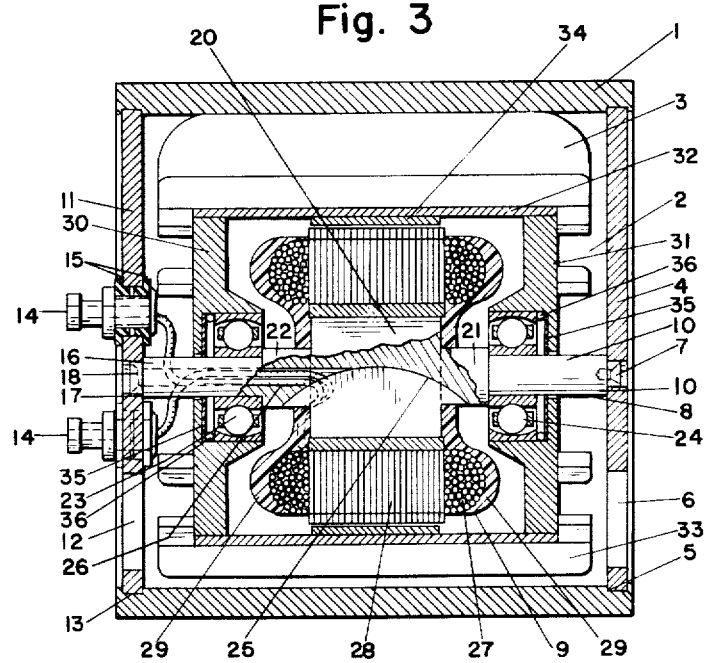
Fig. 3
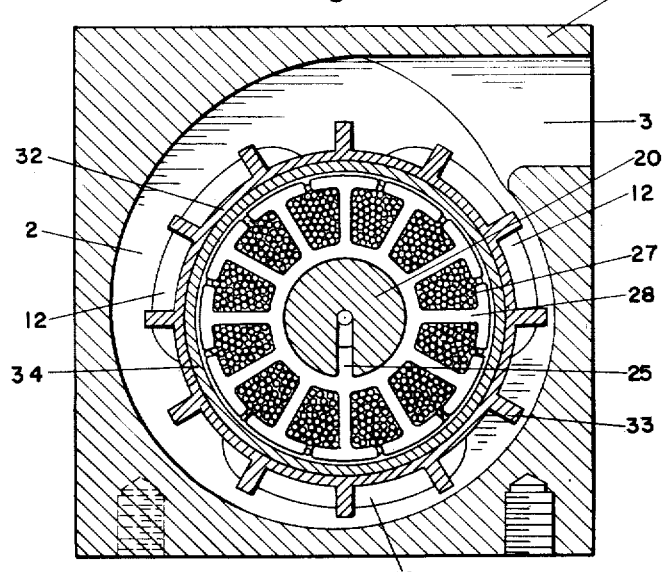
Fig. 4
Fig. 5
POWER SUPPLY
INVENTOR
George J. Shomphe
BY
ATTORNEY United States Patent Office 2,772,046
Patented Nov. 27, 1956

2,772,046
ELECTRIC BLOWER

George J. Shomphe, Nashua, N. H., assignor to Sanders Associates, Incorporated, Nashua, N. H.

Application November 23, 1953, Serial No. 393,695

7 Claims. (Cl. 230—117)

This invention relates to electric blowers. More particularly, it is concerned with blowers which are generally of small size and compact design while having a relatively large capacity for causing the flow of air.

It is an object of the present invention to provide an improved electric blower.

It is a further object of the invention to provide an electric blower of the type described adapted to be of small and compact design, while effecting a relatively large flow of fluid or air.

Other and further objects will be apparent from the following description of a preferred embodiment of the present invention.

While the blower of the present invention is of general application and useful wherever the circulation of fluid or air is required, it is particularly applicable for cooling electronic equipment. Frequently, in such equipment the problem of removing excess heat is an important one and particularly where such equipment is designed in a very compact form.

In accordance with the invention there is provided an electric blower. The blower comprises a housing having a plenum chamber formed therein and a passageway formed in one wall of the housing to conduct fluid from the chamber. Circular apertures are formed in other opposite walls of the housing for access to the chamber. Perforated circular disks are secured in the apertures to form walls for the chamber. The disks have eccentrically disposed, shaft-mounting holes formed therein. A shaft member extends through the chamber and is supported in the shaft-mounting holes thereby enabling accurate alignment of the shaft along a given axis by rotating the circular disks. Field windings, including a core, are mounted on the shaft for producing a rotating field when connected to a source of current. Electrical conductors extend from the field windings to input terminals. A fan is mounted for rotation about the shaft member and includes a ring member encircling and spaced from the core whereby the rotating field around the core effects rotation of the fan.

In one form of the invention the shaft member is hollow and electrical conductors extend from the field windings through the hollow shaft.

In another form of the invention a centrifugal fan is provided and is mounted for rotation about the shaft member. Roller bearing assemblies are mounted in cavities in supporting members for the fan and include tetra-fluoro-ethylene washer members mounted in the cavities affording a substantially frictionless, dust seal around the shaft. Resilient spring members secure the washers in place and space the bearings from the washers.

By the novel design of the subject blower the construction of the very small unit is possible. In actual practice blowers have been constructed in accordance with this design in which the blower and motor are housed in the structure of a one inch cube that will deliver 3 cubic feet per minute of air. The blower will give satisfactory operation in a temperature range of —55° C. to +125° C. for over 1000 hours.

Such a blower may readily be used in connection with electronic equipment. Because of its performance and small size, it can be incorporated in the design of the equipment and located adjacent the heat generating components for spot-cooling. In sealed equipment where the casing is metal, to dissipate the heat, the blower may be mounted inside the casing for efficient transfer of heat to the casing, which then acts as a radiator, or the blower may be mounted outside the casing to remove heat retained by the casing.

In the accompanying drawings:

Fig. 3 is a sectional view taken on the line 3—3 of Fig. 1;

Fig. 4 is a sectional view taken on the line 4—4 of Fig. 2; and

Fig. 5 is a circuit diagram showing a connection of the blower to a polyphase source.

Figure 1:
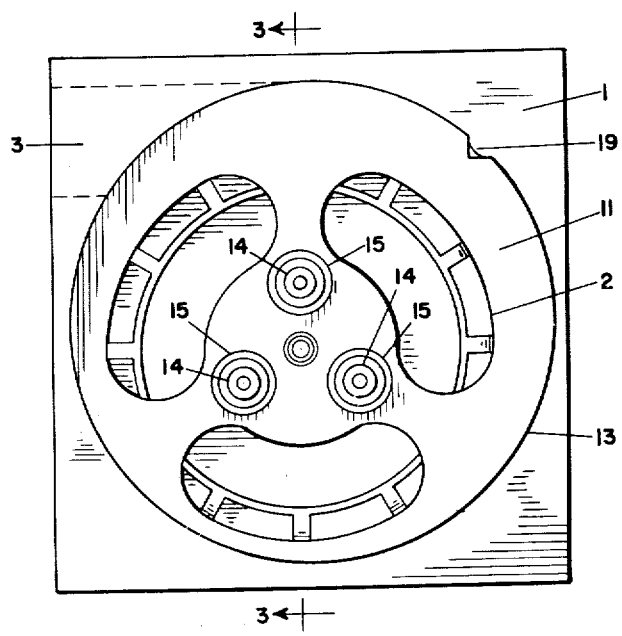
Fig. 1 is an end view of the electric blower showing the electric terminals and air inlet openings.
Figure 2:
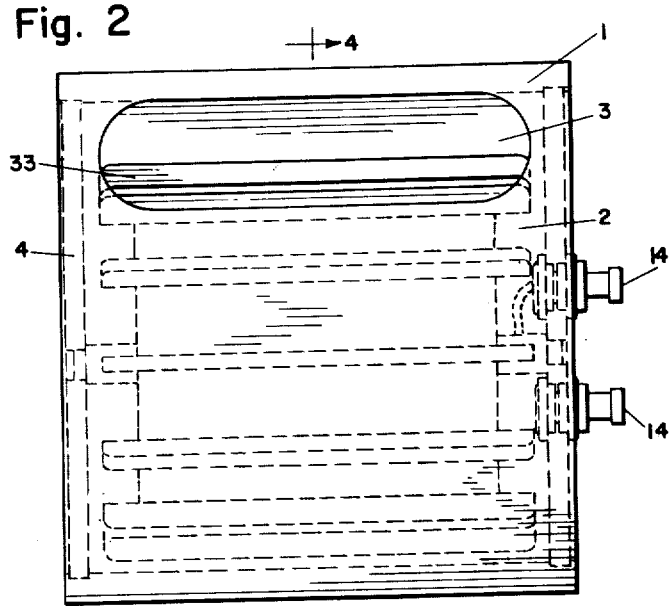
Fig. 2 is a side view of the electric blower showing an air outlet.

The blower shown in the drawings consists of a casing or housing 1 which may be formed from a block of metal or plastic. The block has a plenum chamber 2 extending therethrough which is generally involute in shape with a tangential outlet 3 through one face of the block for conducting air from the chamber to the outside of the housing. The block may have the involute chamber and tangential outlet machined therein or it may be molded or formed by die-casting. While the housing is shown as a block in the drawings it is to be understood that the casting may be of any external shape or form. An important feature is that it provides an involute shaped chamber in which the rotor and motor elements are mounted.

End cap 4 is in the form of a perforated, circular disk and is transversely mounted in a circular recess 5 in the end of the housing, which end forms an end wall for chamber 2. One or more perforations or apertures 6 are formed in end cap 4 for air inlets. A hole shaft-mounting hole 7 is formed in end cap 4 in which shaft portion 8 of the motor stator generally indicated as 9 is secured. It will be noted that hole 7 is eccentrically disposed as related to the circular disk shape of end cap 4 to locate the blower properly in the involute chamber 2. Hole 7 may be broached to receive the end portion of shaft 8 which may be formed with shoulders 10 by a milling cut on each side of the shaft portion 8 so that the shaft will be prevented from rotating with respect to end cap 4.

End cap 11 is similar to end cap 4 and has apertures 12 formed therein for air inlets. It is mounted in a circular recess 13 formed in housing 1. Terminal lugs 14 are supported in cap 11 by insulating bushings 15. Shaft portion 16, having the end formed with shoulder 17, is mounted in hole 18. The shaft-mounting holes 7 and 18 define the axis of rotation of the blower. Eccentrically disposing the holes 7 and 18 relative the circular disks or end caps 4 and 11 enables accurate alignment of the shaft 8 along a given axis by rotating the circular disks.

Both end caps 4 and 11 have a notch 19 or other indicia on the periphery to orient the end caps with respect to the housing during assembly to locate the stator 9 in chamber 2. End caps 4 and 11 are secured in recesses 5 and 13 by staking or any other suitable expedient to secure them firmly in place.

Stator 9 is mounted on a cylindrical member 20 which is supported between end caps 4 and 11 by shaft portions 8 and 16. Enlarged shaft portions 21 and 22 afford shoulders against which conventional roller bearing assemblies 23 and 24 abut. Roller bearings 23 and 24 are mounted on shaft portions 16 and 8, respectively. Cylindrical member 20 and portions 8, 16, 21 and 22 may be formed as an integral member. A slot is cut as shown at 25 in cylindrical member 20 and adjacent enlarged shaft portions 21 and 22 which intercepts a hole drilled through shaft portions 16 and 22 to afford passage for wires 26 from terminal lugs 14 to polyphase windings 27 on stator 9. Slotted core 28 is of laminated construction and is assembled on cylindrical member 20. Windings 27 are placed in slotted core 28 in a conventional manner for polyphase windings so that when the three terminals 14 are connected to a suitable polyphase power supply as shown in Fig. 5, a rotating field around core 28 will be produced. Windings 27 are sealed by insulating material 29 which is molded or otherwise secured over the ends of the windings on stator 9.

The blower rotor or centrifugal fan comprises end members 30 and 31 carried by the outer races of bearings 23 and 24. A washer 35 of tough plastic material having a low coefficient of friction such as Teflon, trademark of E. I. du Pont de Nemours and Company for tetrafluoroethylene, is held in place between each of the outer races of bearings 23 and 24 by resilient spring 36. Springs 36 not only hold the Teflon washers in place, but separate them from the moving parts of the ball bearings. The washers are necessary to keep dust from getting into the ball bearings. Sleeve 32 is mounted on members 30 and 31 and rotates therewith around the shaft of stator 9. Radial fins 33 extend axially of sleeve 32 and may be formed integrally therewith. It will be noted that the ends of fins 33 extend beyond sleeve 32 into the spaces between members 30 and 31 and end caps 4 and 11 of the housing to form therewith radial passages through which air is caused to flow by centrifugal force from inlet openings 6 and 12 into chamber 2 and out passage 3. Hysteresis ring 34 is secured to sleeve 32 and rotates therewith. Ring 34 is spaced from core 28 by an amount to cause magnetic polarization to be induced therein which, with the rotating field from the stator, will effect rotation of the ring. Inasmuch as ring 34 is secured to and carried by sleeve 32, rotation of the centrifugal fan results.

It is to be understood that any suitable materials may be used in the construction of this blower. For ease of manufacture it has been found that the housing 1 and end caps 4 and 11 can be made from aluminum. The shaft assembly comprising portions 8, 16, 21 and 22 may be made of non-magnetic, stainless steel. Ring 34 is of chrome steel. Laminated core 28 will be of transformer steel. The centrifugal fan assembly in the preferred embodiment will be made of aluminum.

While there has been shown and described a particular embodiment of the present invention, it will be apparent to those skilled in the art that various changes and modifications may be made without departing from the spirit of the invention, and it is therefore intended in the appended claims to cover all such changes and modifications as fall fairly within the spirit and scope of this invention.

What is claimed is:

1. An electric blower, comprising: a housing having a plenum chamber formed therein and a passageway formed in one wall of the housing to conduct fluid from said chamber; circular apertures formed in other opposite walls of said housing for access to said chamber; perforated circular disks secured in said apertures to form walls for said chamber, said disks having eccentrically disposed shaft-mounting holes formed therein; a shaft member extending through said chamber and supported in said shaft-mounting holes thereby enabling accurate alignment of said shaft along a given axis by rotating said circular disks; field windings including a core mounted on said shaft for producing a rotating field when connected to a source of current; electrical conductors extending from said field windings to input terminals; and a fan mounted for rotation about said shaft member and including a ring member encircling and spaced from said core whereby the rotating field around said core effects rotation of said fan.

2. An electric blower, comprising: a housing having a plenum chamber formed therein, a tangential passageway formed in the housing to conduct air from said chamber, and circular recesses formed in each end of said housing around said chamber; transverse perforated circular disks secured in said recesses forming end walls of said chamber, said disks having eccentrically disposed shaft-mounting holes formed therein; a shaft member extending through said chamber and supported in said shaft-mounting holes, thereby enabling accurate alignment of said shaft along a given axis by rotating said circular disks; a slotted laminated core mounted on said shaft; field windings in said core arranged to produce a rotating field when connected to a source of polyphase current; a centrifugal fan mounted for rotation about said shaft member; and a ring member secured to said fan for rotation therewith adjacent said core whereby the rotating field around said core effects rotation of said centrifugal fan.

3. An electric blower, comprising: a housing having a generally involute chamber formed therein, a passageway formed in the housing to conduct air from said chamber, and circular recesses formed in each end of said housing around said chamber; transverse perforated circular disks secured in said recesses forming end walls of said chamber, said disks having eccentrically disposed shaft-mounting holes formed therein and three symmetrically disposed arms extending radially from said mounting holes; a shaft member extending through said chamber and supported in said shaft-mounting holes, thereby enabling accurate alignment of said shaft along a given axis by rotating said circular disks; a slotted laminated core mounted on said shaft; field windings in said core arranged to produce a rotating field when connected to a source of polyphase current; a centrifugal fan mounted for rotation about said shaft member; and a ring member secured to said fan for rotation therewith adjacent said core whereby the rotating field around said core effects rotation of said centrifugal fan.

4. An electric blower, comprising: a housing having a plenum chamber formed therein, a tangential passageway formed in the housing to conduct air from said chamber, and circular recesses formed in each end of said housing around said chamber; transverse perforated circular disks secured in said recesses forming end walls of said chamber, said eccentrically disposed shaft-mounting holes formed therein; a hollow shaft member extending through said chamber and supported in said shaft-mounting holes, thereby enabling accurate alignment of said shaft along a given axis by rotating said disks; a slotted laminated core mounted on said shaft; field windings in said core arranged to produce a rotating field when connected to a source of polyphase current; conductors extending from said field windings through said shaft; a centrifugal fan mounted for rotation about said shaft member, said fan comprising a cylindrical sleeve, axially extending radial fins secured to the periphery of said sleeve, said fins being longer than the axial length of said sleeve to project into the space between the ends of said sleeve and said end walls; and a ring member mounted on said fan for rotation adjacent said core whereby the rotating field around said core effects rotations of said centrifugal fan.

5. An electric blower, comprising: a housing having a generally involute chamber formed therein and a tangential passageway formed in the housing to conduct air from said chamber; transverse members on each end of said housing forming end walls of said chamber, said transverse members having inlet apertures formed therein; a shaft member extending through said chamber supported by said transverse members; a slotted laminated core mounted on said shaft; field windings in said core arranged to produce a rotating field when connected to a source of polyphase current, a centrifugal fan comprising a cylindrical sleeve, supporting members within said sleeve at each end thereof to mount said sleeve for rotation about said shaft member, roller bearing assemblies mounted in cavities in said supporting members, tetra-fluoro-ethylene washer members mounted in said cavities affording a substantially frictionless dust seal around said shaft, resilient spring members to secure said washers in place and space said bearings from said washers, and fin members secured to said sleeve extending between the ends of said sleeve and said end wall of said housing; and a ring member mounted on said fan for rotation adjacent said core whereby the rotating field around said core effects rotation of said centrifugal fan.

6. An electric blower, comprising: a housing having a plenum chamber formed therein, a passageway formed in the housing to conduct air from said chamber, and circular recesses formed in each end of said housing around said chamber; transverse perforated circular disks secured in said recesses forming end walls of said chamber; a hollow shaft member extending through said chamber supported by said end walls mounted eccentrically thereof; a slotted laminated core mounted on said shaft; field windings in said core arranged to produce a rotating field when connected to a source of polyphase current; electrical terminals mounted on said transverse disks adjacent said hollow shaft; wires extending from said terminals to said field windings through said hollow shaft; a centrifugal fan mounted for rotation about said shaft member; and a ring member secured to said fan for rotation adjacent said core whereby the rotating field around said core effects rotation of said centrifugal fan.

7. An electric blower, comprising: a housing having a generally involute chamber formed therein, a tangential passageway formed in the housing to conduct air from said chamber, and circular recesses formed in each end of said housing around said chamber; transverse perforated circular disks secured in said recesses forming end walls of said chamber; a hollow shaft member extending through said chamber supported by said end walls mounted eccentrically thereof; a slotted laminated core mounted on said shaft; field windings in said core arranged to produce a rotating field when connected to a source of polyphase current; electrical terminals mounted on said transverse disks adjacent said hollow shaft; wires extending from said terminals to said field windings through said hollow shaft; a fan mounted for rotation about said shaft member; blower fins mounted on said fan for moving air from the space adjacent said perforated disks into said involute chamber; and a ring member secured to said fan for rotation adjacent said core whereby the rotating field around said core effects rotation of said centrifugal fan.

References Cited in the file of this patent
UNITED STATES PATENTS

| | | |
|---|---|---|
| 1,921,218 | Colby | Aug. 8, 1933 |
| 2,041,875 | Stoller | May 26, 1936 |
| 2,256,659 | Thrasher | Sept. 23, 1941 |
| 2,482,847 | Godman | Sept. 27, 1949 |
| 2,495,895 | Hervert | Jan. 31, 1950 |

UNITED STATES PATENT OFFICE

CERTIFICATE OF CORRECTION

Patent No. 2,772,046　　　　　　　　　　　　　　　　November 27, 1956

George J. Shomphe

It is hereby certified that error appears in the printed specification of the above numbered patent requiring correction and that the said Letters Patent should read as corrected below.

Column 2, line 34, for "casting" read -- casing --;  line 42, strike out "hole".

Signed and sealed this 12th day of November 1957.

(SEAL)
Attest:

KARL H. AXLINE
Attesting Officer

ROBERT C. WATSON
Commissioner of Patents